(12) United States Patent
de Jong

(10) Patent No.: US 6,792,879 B2
(45) Date of Patent: Sep. 21, 2004

(54) STORAGE SHELF FOR GOODS OR PACKAGED GOODS LIKE LOADED PALLETS

(75) Inventor: Leen-Pieter de Jong, Varsseveld (NL)

(73) Assignee: NEDCON Magazijninrichting B.V., Doetinchem (NL)

( * ) Notice: Subject to any disclaimer, the term of this patent is extended or adjusted under 35 U.S.C. 154(b) by 23 days.

(21) Appl. No.: 10/065,140

(22) Filed: Sep. 20, 2002

(65) Prior Publication Data

US 2004/0016374 A1 Jan. 29, 2004

(30) Foreign Application Priority Data

Jul. 27, 2002 (DE) .......................................... 102 34 360

(51) Int. Cl.⁷ .............................................. B65D 19/00
(52) U.S. Cl. ................................. 108/51.11; 108/57.15; 108/91
(58) Field of Search ........................ 108/51.11, 53.1, 108/54.1, 53.3, 53.5, 55.3, 91, 92, 93, 57.15; 211/134, 188, 151, 194; 206/399

(56) References Cited

U.S. PATENT DOCUMENTS

| | | | | |
|---|---|---|---|---|
| 622,666 A | * | 4/1899 | Burwell | 182/223 |
| 1,317,550 A | * | 9/1919 | Cass | 108/27 |
| 2,828,931 A | * | 4/1958 | Harvey | 108/54.1 |
| 2,972,463 A | * | 2/1961 | Matthews et al. | 108/54.1 |
| 3,063,769 A | * | 11/1962 | Graber et al. | 108/53.1 |
| 3,176,632 A | * | 4/1965 | Joseph | 108/54.1 |
| 3,664,273 A | * | 5/1972 | Howe | 108/53.1 |
| 5,018,629 A | * | 5/1991 | Lamar | 211/194 |
| 5,169,011 A | * | 12/1992 | Ebeling et al. | 211/195 |
| 5,706,738 A | * | 1/1998 | Rapeli | 108/54.1 |
| 6,003,449 A | * | 12/1999 | Manidis | 108/54.1 |

FOREIGN PATENT DOCUMENTS

JP 6-92356 * 4/1994

* cited by examiner

*Primary Examiner*—Jose V. Chen
(74) *Attorney, Agent, or Firm*—Gudrun E. Huckett

(57) ABSTRACT

A storage shelf with shelf planes is divided into shelf compartments extending in direction of depth of the storage shelf. Articles are stored within the shelf planes adjacent and behind one another in the depth direction. The shelf compartments have a frontmost position, at least one middle depth position arranged behind the frontmost position, and a rearmost depth position. An operating device can access the frontmost position and the at least one middle depth position arranged behind the frontmost position for placing or remove the articles but the rearmost position is not accessible by the operating device. The shelf compartments comprise a stationary support and a moveable carriage for the articles. The carriage is movable between a forward position and a rearward position by a stroke length matching a length of the depth positions. The carriage in the rearward position stores the articles in the rearmost depth position.

8 Claims, 3 Drawing Sheets

STORAGE SHELF FOR GOODS OR PACKAGED GOODS LIKE LOADED PALLETS

BACKGROUND OF INVENTION

1. Field of the Invention

The invention relates to a storage shelf for goods or packaged goods, such as loaded pallets, for storing goods within the levels or planes of the shelves adjacent to one another as well as behind one another in the direction of the depth of the shelf. An operating device correlated with the storage shelf is configured to access the frontmost as well as at least one depth position of the respective shelf compartment arranged behind the frontmost position in order to place goods at or remove goods from these locations.

2. Description of the Related Art

Such storage shelves can be found primarily in large storage facilities comprising automated, computer-controlled pallets which are stored in and removed from the storage facility as needed. The standardized pallets are placed into and removed from a designated compartment of the shelf by means of specially constructed shelf operating devices. In this connection, the pallets are positioned on profiled members which extend in the depth direction of the shelf. When mounting the profiled members, care must be taken to provide a certain free space in the vertical direction into which the telescoping forks of the operating device can move for placing goods or for removing goods.

In order to achieve in large storage facilities an improved utilization of the available basic surface area, it is known, for example, from European patent 0 935 932 B1, to provide storage shelves with twice the storage depth. In this connection, the loaded pallets are positioned within one level of the shelf adjacent to one another as well as sequentially behind one another, i.e., in the direction of the shelf depth. The concept of storing more than two pallets behind one another in the direction of the shelf depth, however, fails because of static conditions of the shelf operating device. The employed telescoping forks which are laterally movable into the shelves must be able to withstand significant tilting and bending moments already in the case when only a first depth position for storing or removing is to be accessed. These forces are correspondingly higher in the case of storing or removing goods in a second depth position of the shelf compartment arranged behind the first (frontal) one. In order to be able to store goods in or remove goods from a third depth position behind the second depth position, the telescoping arms of the shelf operating device would have to be extremely heavy and voluminous in order to withstand the bending loads acting during use, in particular in the case of pallets with heavy loads. In practice, this concept is therefore avoided and pallets are stored, at most, in a double depth arrangements.

SUMMARY OF INVENTION

It is an object of the present invention to provide a storage shelf for goods or packaged goods with which by means of simple constructive means an enlargement of the storage depth and an improved utilization of the available basic surface area of a shelf storage facility can be obtained.

In accordance with the present invention, this is achieved in that for a storage shelf of the aforementioned kind the shelf compartment comprises, in addition to the frontmost and the at least one depth position arranged behind it, an additional rearmost depth position which cannot be accessed by the operating device, wherein within the shelf compartment a stationary support for the goods and a movable support for the goods are arranged, wherein the movable support for the goods is a carriage which is movable between a forward position and a rearward position by a length of a depth position, and wherein in the rearward position of the carriage those goods are stored which are in the rearmost depth position.

Such a storage shelf enables storing of goods or packaged goods, for example, in the form of pallets, at more than the double depth without straining the statics of the employed operating device. With the storage shelf according to the invention it is particularly possible to realize shelf compartments with three depth positions, i.e., a total of three pallets can be stored sequentially behind one another in the storage shelf. In this connection, when taking into account that on the other side of the aisle located in front of the storage shelf, in which aisle the operating device moves, a matching second storage shelf, is arranged, the operating device can store goods on either side of the aisle into a shelf compartment of triple depth in any position within the aisle, i.e., a total of six pallets can be stored in any position.

These advantages are achieved by dividing the supports for the goods of the shelf compartment. In each one of the shelf compartments a stationary support for goods and a movable support for goods are arranged, wherein the movable support for goods is a movable carriage. The carriage is movable between a forward position closer to the aisle and a rearward position, wherein the stroke of this movement matches a length of one depth position. The goods which are positioned in the rearmost depth position of the shelf compartment rest on the carriage when the carriage is in the rearward one of its two possible positions. The carriage, which preferably is shorter by one depth position than the total length of all depth positions of the storage compartment, is preferably provided at its forward end with a projection. This projection projects upwardly past the support surface of the carriage and serves for providing a longitudinal supporting action of the goods which are positioned in the frontmost position on the carriage.

According to a preferred embodiment, it is suggested that the carriage is provided with cutouts, extending in a longitudinal direction and being open toward a loading side of the shelf, allowing a free vertical penetration of the lifting fork of the operating device. These cutouts enable a free vertical penetration of the lifting or telescoping fork of the operating device when placing the goods onto the carriage or removing the goods from the carriage. A further embodiment is characterized by utilizing an operating device whose lifting fork is provided at its free ends with upwardly projecting projections. These projections are provided for partially engaging from behind the goods positioned on the lifting fork. The operating device can thus engage from behind the respective goods and can pull them forwardly within the shelf compartment. This movement is indirectly transmitted, i.e., by means of the goods which are engaged in this way, also onto the carriage so that as a result the lifting of the operating device is used to return the carriage from its rearmost position into its frontmost position.

Moreover, it is suggested that the carriage is provided with means for increasing the pushing resistance acting in the longitudinal direction between its upper side and the bottom side of the goods and that the pushing resistance generated in this way is greater than the moving resistance of the carriage. This configuration has the advantage that a pulling action or pushing action acting on the goods is transmitted on the carriage on which the goods rest. For moving the carriage it is no longer required to pull or push the carriage directly. Instead, this can be achieved indirectly by means of the goods positioned on the carriage.

Furthermore, it is suggested to configure the carriage to be moveable on rollers within the shelf compartment in order to keep the moving resistance of the carriage within the shelf compartment as minimal as possible. In order to enable a certain fixation of the carriage as soon as it is in the forward or rearward position, the carriage can be provided with means for increasing the rolling resistance. The obtained, position-dependent rolling resistance is smaller than the frictional or pushing resistance between the upper side of the carriage and the bottom side of the goods which are resting on the carriage.

DETAILED DESCRIPTION

Figure 1:
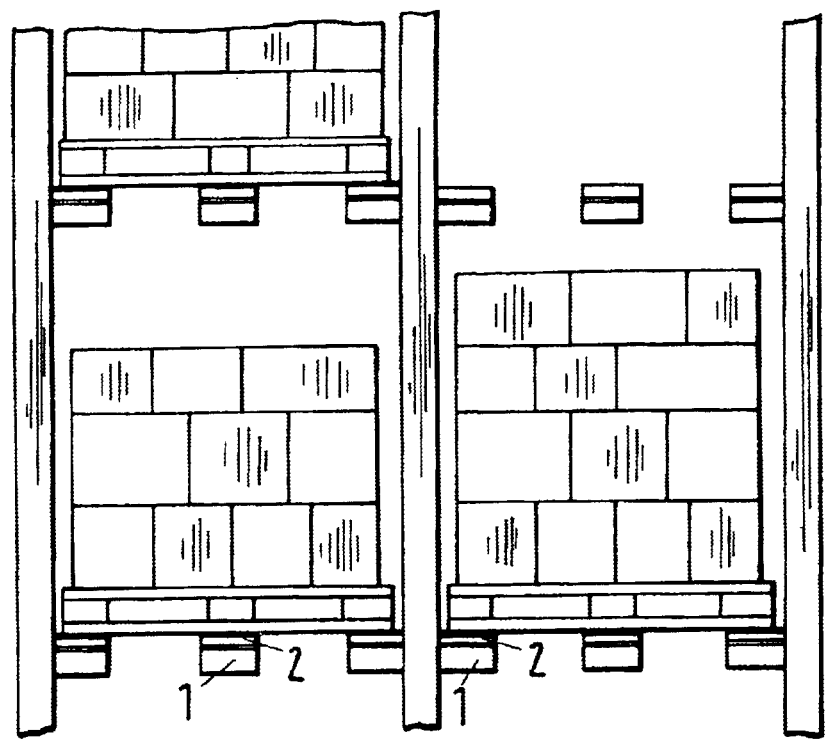
FIG. 1 is a view of the loading side of a multi-level storage shelf for triple-depth storage of loaded pallets.
Figure 2:
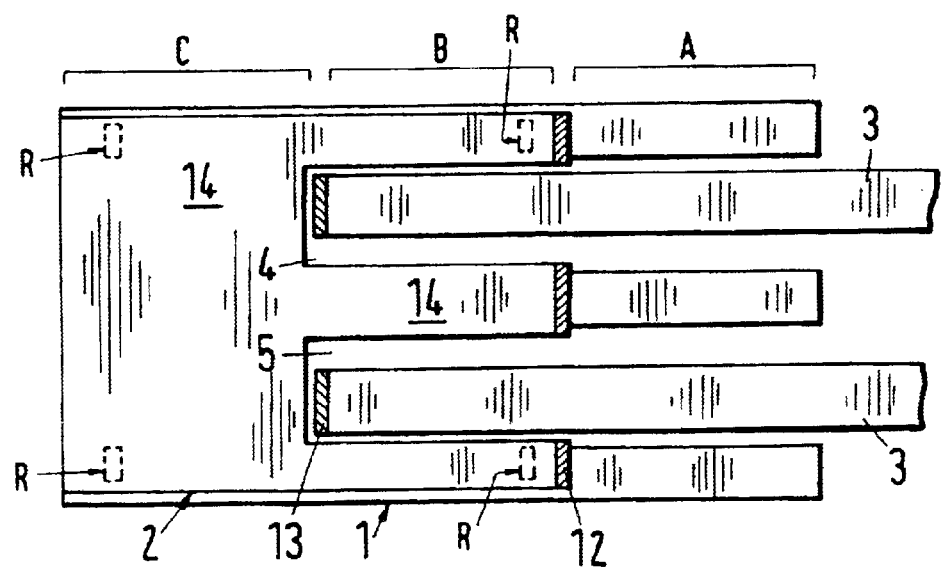
FIG. 2 is a plan view onto a shelf compartment configured for a triple-depth storage of pallets.

FIG. 1 shows a view onto the loading side of a storage shelf having shelf compartments arranged adjacent to one another and on top of one another. Identical pallets which are loaded with packaged goods are stored in the shelf compartments. In the following, the term 'article' will be used for reasons of simplification for the loaded pallets or goods. In each one of the shelf compartments three articles can be stored sequentially behind one another. The frontmost article is in the frontmost depth position A, the second article is positioned in the depth position B, and the article is positioned in the rearmost depth position C of the shelf compartment, respectively. The depth positions A, B, C are identified in the plan view of FIG. 2. FIG. 2 also shows that the shelf compartment is not of a uniform construction in the direction of its depth and that areas A, B, C are different. In the shelf compartment a stationary support 1 as well as a support for goods in the form of a movable carriage 2 are provided. The stationary support 1 as well as the carriage 2 are horizontal, i,e., they are not inclined. The stationary support 1 for the articles is divided into three parts according to the conventional configuration of pallets and extends in the described embodiment over the entire depth of the shelf compartment. Within the context of the invention, it would however be sufficient if the stationary support 1 were limited to the area A of the frontmost depth position because the articles are positioned directly onto the stationary support 1 only in the area A.

In contrast to this, when articles are to be placed onto the central depth position B or the rearmost depth position C, the articles are always positioned on the longitudinally movable carriage 2 and not on the stationary support 1. For realizing the movability of the carriage 2, it can be provided, for example, with rollers R (FIG. 2) for moving it on the stationary support 1. In the alternative, it is also possible to guide the carriage 2 on a separate guide path. Advantageously locking means are provided with which the carriage 2 can be easily secured or locked in both end positions. This locking action can be released against a minimal resistance.

Figure 3:
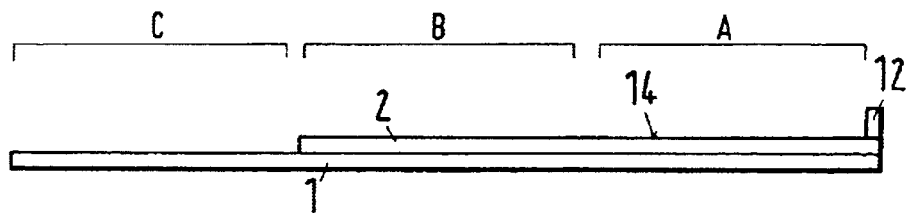
FIG. 3 illustrates a first step of storing/removing packaged goods in/from a shelf compartment according to FIG. 2 in a view onto a longitudinal side of the shelf compartment.

In the plan view according to FIG. 2, the carriage 2 is in the rearward one of its two positions. In this rearward position the carriage 2 extends across the central depth position B as well as the rearmost depth position C. The frontmost depth position A, however, is formed by the stationary support 1. When the carriage 2 is in its forward position, it is simultaneously within the two areas A and B. This position of the carriage 2 is illustrated in FIG. 3 in a view onto the longitudinal side. FIG. 2 also shows the lifting fork 3 of a shelf operating device. The lifting fork 3 is a telescoping fork so that it is extendable far enough into the shelf compartment.

In order to provide space for a vertical lifting (removing of goods) and dropping (placing of goods) movement of the lifting fork 3, the carriage 2 is provided with cutouts 4, 5 at its forward half which extend in the longitudinal direction of the carriage 2 and are open toward the loading side of the shelf. One cutout 4 enables the vertical penetration of one of the two lifting fork arms, the cutout 5 that of the other lifting fork arm.

The stationery support 1 is also configured such that it does not impair the vertical penetration of a lifting fork, for example, in the form of elongate profiled members. Preferably, the stationery support 1 for this purpose is comprised of a total of three profiled members arranged at a spacing to one another whose upper side provides at the same time the rolling surface for the carriage 2 which can reciprocate on it.

The lifting fork 3 is provided at its free ends with upwardly projecting projections 13 for a partial engagement from behind of the articles arranged on the lifting forks Similarly configured projections 12 are provided at the forward ends of the carriage 2. The projections 12 project past the support surface 14 of the flat upper side of the carriage and serve for supporting the goods which are in the frontmost position on the carriage 2 in a longitudinal direction.

While, as also shown in FIG. 2, the forward half of the carriage 2 is provided with cutouts 4, 5 for the lifting fork, the rearward half of the carriage 2 can be completely closed.

With the aid of FIGS. 3–14 the novel method for storing and removing goods in triple depth will be described in the following.

Figure 4:
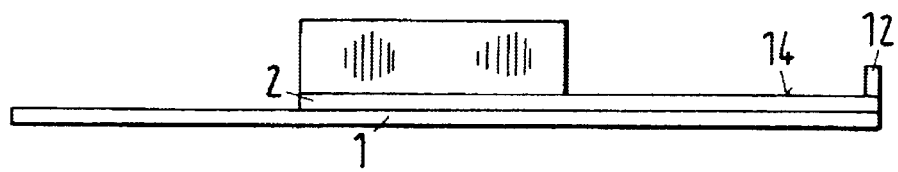
FIG. 4 illustrates in a view corresponding to FIG. 3 a second step of storing/removing packaged goods in/from the shelf compartment of FIG. 3.
Figure 5:
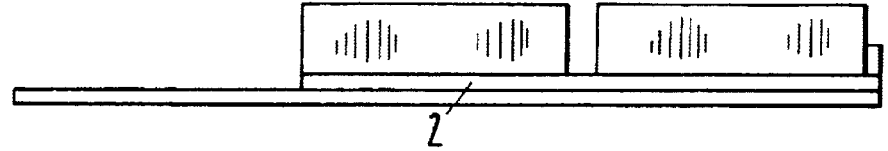
FIG. 5 illustrates in a view corresponding to FIG. 3 a third step of storing/removing packaged goods in/from the shelf compartment of FIG. 3.

FIG. 3 shows the shelf compartment in its empty state. The carriage 2 is positioned in its forward position, i.e., in the depth positions A and B. When by means of the operating device an article is be stored in the shelf compartment, it is placed by the lifting fork of the operating device in the central depth position B, as illustrated in FIG. 4. During this step the carriage 2 is in its forward position. When a second article is to be stored, the second article is positioned by the operating device in the frontmost depth position A, as illustrated in FIG. 5. The forward end face 15 of this article is positioned as closely as possible behind in the projection 12 of the carriage 2. FIG. 5 shows even a contact of the end face 15 on the backside of the projection 12.

Figure 6:
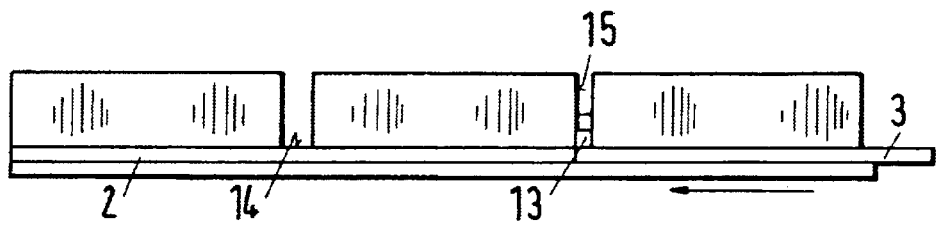
FIG. 6 illustrates in a view corresponding to FIG. 3 a fourth step of storing/removing packaged goods in/from the shelf compartment of FIG. 3.

FIG. 6 shows the placement of an additional third article. For this purpose, the lifting fork 3 of the operating device moves against the end face 15 of the article that is in the depth position A and moves it to the rear. However, not only this article is moved to the rear, but the carriage 2 as well as the article located in the depth position B are moved to the rear together with the article of position A. This indirect movement of the carriage 2 by exerting a pressure onto the article positioned on the carriage 2 is possible because the friction between the article and the carriage 2 is greater than the moving resistance of the carriage in the shelf compartment. This is achieved preferably in that the carriage 2 is supported on rollers so as to be moveable on the rollers within the shelf compartment and on the stationery support 1. This roller support operates with such minimal resistance that it is possible by exerting pressure on the article to move the carriage on which the article is positioned as well as, optionally, the additional article located on the rearward portion of the carriage 2.

FIG. 6 shows the end of this movement phase. Of the total of three articles, the first article that was placed first onto the shelf is now in the position C; the article that subsequently placed onto the shelf is now in the position B, and the last article is in the frontal depth position A.

Figure 7:
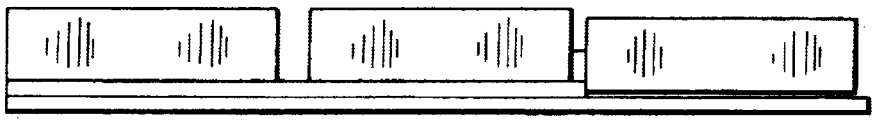
FIG. 7 illustrates in a view corresponding to FIG. 3 a fifth step of storing/removing packaged goods in/from the storage compartment of FIG. 3.

According to FIG. 7, the lifting fork 3 has been lowered and the article which has been placed last onto the shelf is now resting on the stationary support 1. In this way, this article is now on a level which is slightly lower than that of the two other articles which are positioned both on the upper side 14 of the carriage 2.

Figure 8:
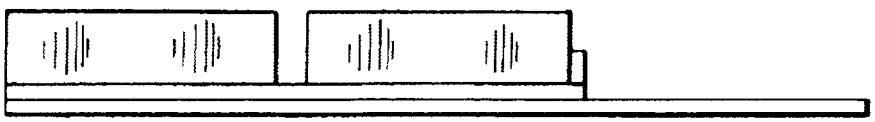
FIG. 8 illustrates in a view corresponding to FIG. 3 a sixth step of storing/removing packaged goods in/from the storage compartment of FIG. 3.

When one of the articles is removed again, the situation illustrated in FIG. 8 will result. The article which is removed is the article in the frontmost depth position A. Nothing has changed for the other articles which are positioned on the carriage 2.

Figure 9:
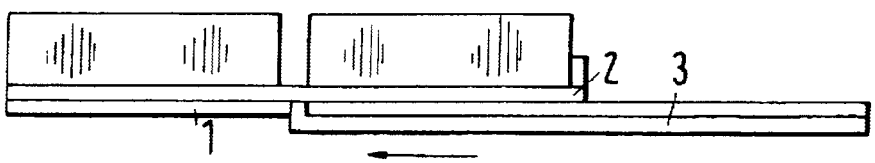
FIG. 9 illustrates in a view corresponding to FIG. 3 a seventh step of storing/removing packaged goods in/from the shelf compartment of FIG. 3.
Figure 12:
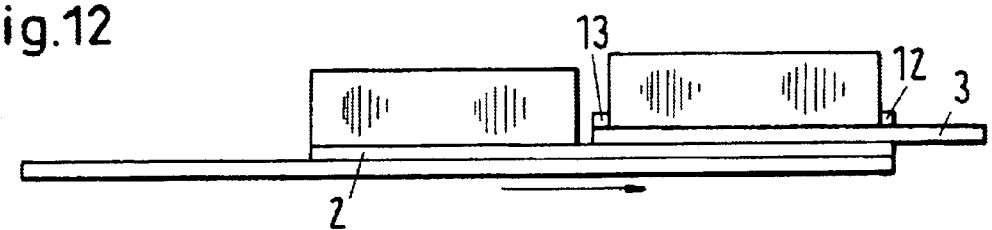
FIG. 12 illustrates a ninth step of storing/removing packaged goods in/from the storage compartment of FIG. 3.

When it is desired to remove an additional article, the lifting fork 3, as illustrated in FIG. 9, must be extended into the central depth position B. Subsequently, the lifting fork 3 is lifted according to FIG. 10 and lifts the article which is in the central depth position B at most only slightly. In this connection, the projection 13 of the lifting fork 3 engages this article from behind while the same article is resting with its forward end face 15 on the projection 12 of the carriage 2. The article is therefore clamped in the longitudinal direction between the projections 12 and 13. When a pulling force is now exerted on the lifting fork 3, the article is returned to the loading side of the storage shelf by means of the projections 13. However, since the same article rests against the projections 12, the pulling force 16 indirectly also effects a return of the carriage 2 from its rearward position into its forward position. FIG. 12 illustrates that the forward position has been reached.

Figure 10:
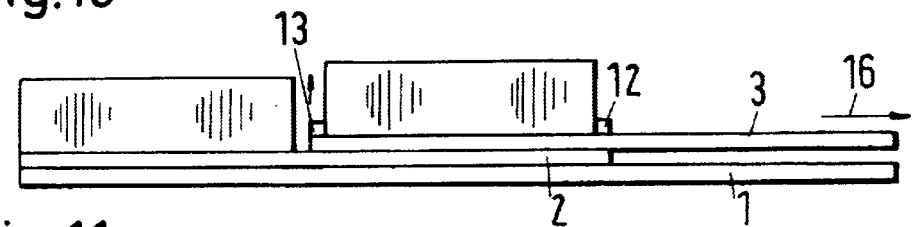
FIG. 10 illustrates in a view corresponding to FIG. 3 an eighth step of storing/removing packaged goods in/from the shelf compartment of FIG. 3.
Figure 11:
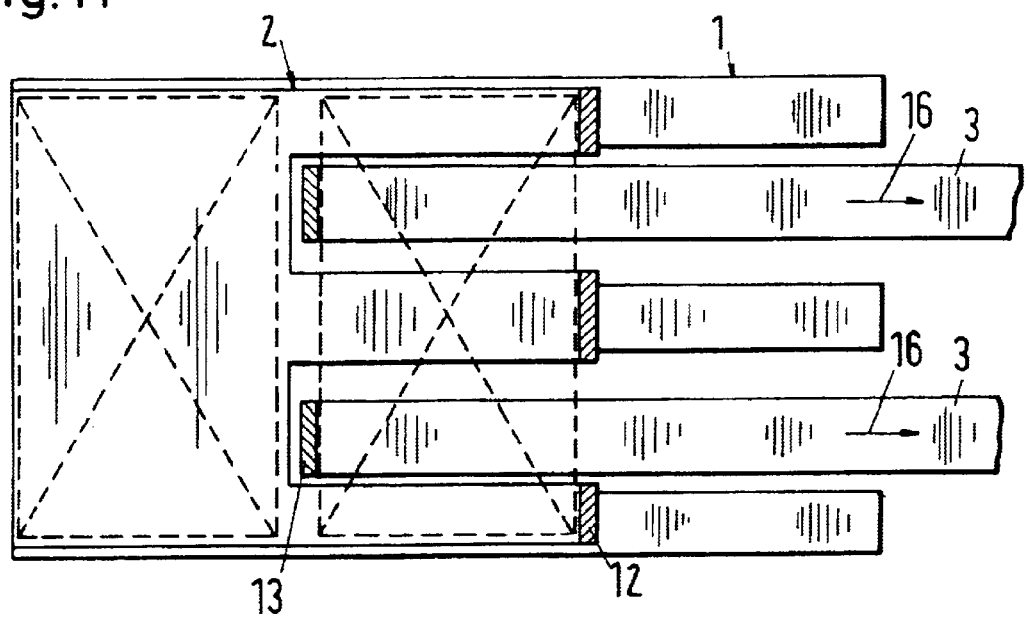
FIG. 11 is a plan view onto the shelf compartment for the method step of FIG. 10.

FIG. 11 shows in a plan view the indirect retraction of the carriage 2 according to FIG. 10 by means of the article clamped between the projections 12, 13.

Figure 13:
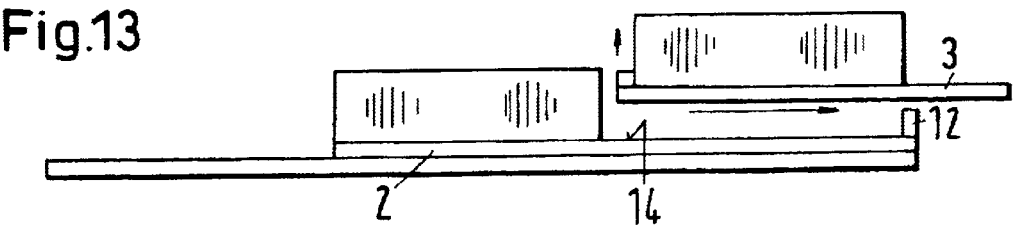
FIG. 13 illustrates a tenth step of storing/removing packaged goods in/from the storage compartment of FIG. 3.
Figure 14:
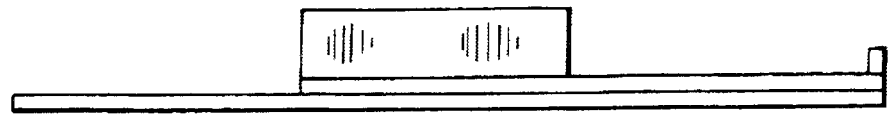
FIG. 14 shows an eleventh step of storing/removing packaged goods in/from the storage compartment or FIG. 3.

When according to FIG. 12 the carriage 2 has reached its forward position, the lifting fork 3 is then lifted according to FIG. 13 for entraining the article. In this way, according to FIG. 14, only one article remains within the shelf compartment. It is positioned in the central or middle depth position B on the carriage 2; the carriage 2 has again reached its original forward position.

The above explanations make it clear that articles can be stored in three depth positions sequentially behind one another even though the lifting fork 3 of the operating device extends only to the middle depth position B.

While specific embodiments of the invention have been shown and described in detail to illustrate the inventive principles, it will be understood that the invention may be embodied otherwise without departing from such principles.

What is claimed is:

1. A storage shelf for articles, the storage shelf comprising shelf planes divided into shelf compartments extending in a direction of depth of the storage shelf, wherein the articles are stored within the shelf planes adjacent to one another as well as sequentially behind one another in the direction of depth of the storage shelf, wherein the shelf compartments have several depth positions comprising a frontmost position, at least one middle depth position arranged behind the frontmost position, and a rearmost depth position in the direction of depth of the storage shelf, respectively, wherein an operating device correlated with the storage shelf is configured to access the frontmost position and the at least one middle depth position arranged behind the frontmost position in order to place or remove the articles but the rearmost position is out of an operating reach of the operating device, wherein the shelf compartments comprise a stationary support (1) for the articles and a moveable carriage (2) for the articles, wherein the carriage (2) is movable between a forward position and a rearward position, wherein a stroke length of the movement from the forward position on the rearward position matches a length of one of the depth positions, respectively, wherein the carriage (2) in the rearward position stores the articles in the rearmost depth position.

2. The storage shelf according to claim 1, wherein the carriage (2) is shorter by one of the depth positions than the shelf compartment.

3. The storage shelf according to claim 1, wherein the shelf compartment comprises three of the depth positions (A, B, C) and wherein the carriage (2) extends across two of the depth positions (B, C).

4. The storage shelf according to claim 1, wherein the carriage (2) has an upwardly extending projection (12) projecting past a support surface (14) of the carriage (2), wherein the projection (12) is configured to provide a support action in a longitudinal direction of the carriage (2) for the articles located in a frontmost position on the carriage (2).

5. The storage shelf according to claim 4, wherein the support surface (14) of the carriage (2) is located higher than a support surface of the stationary support (1).

6. The storage shelf according to claim 1, wherein the carriage (2) has cutouts (4, 5) extending in a longitudinal direction of the carriage (2) and being open toward a loading side of the storage shelf, wherein the cutouts have a shape matching a shape of a lifting fork of the operating device so that the lifting fork (3) of the operating device is able to pass vertically through the cutouts.

7. The storage shelf according to claim 1, wherein the operating device has a lifting fork (3) having free ends provided with an upwardly extending projection (13), respectively, configured for a partial engagement from behind of the articles positioned on the lifting fork (3).

8. The storage shelf according to claim 1, wherein the carriage (2) comprises rollers and is movable on the rollers in the shelf compartment.

* * * * *